No. 730,460.

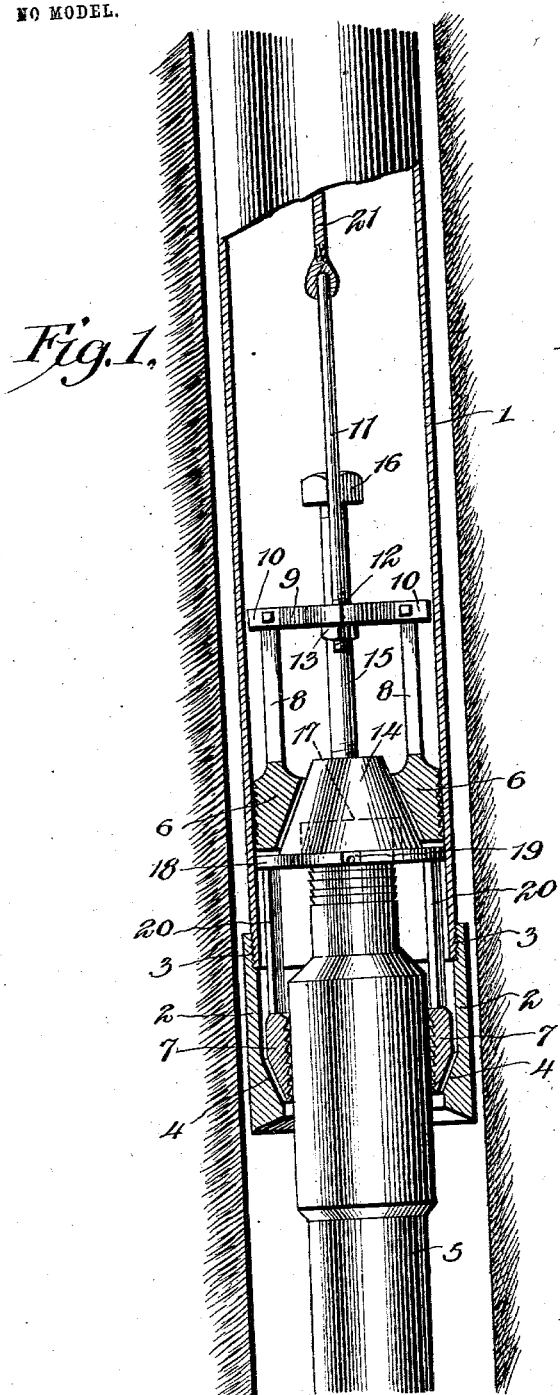
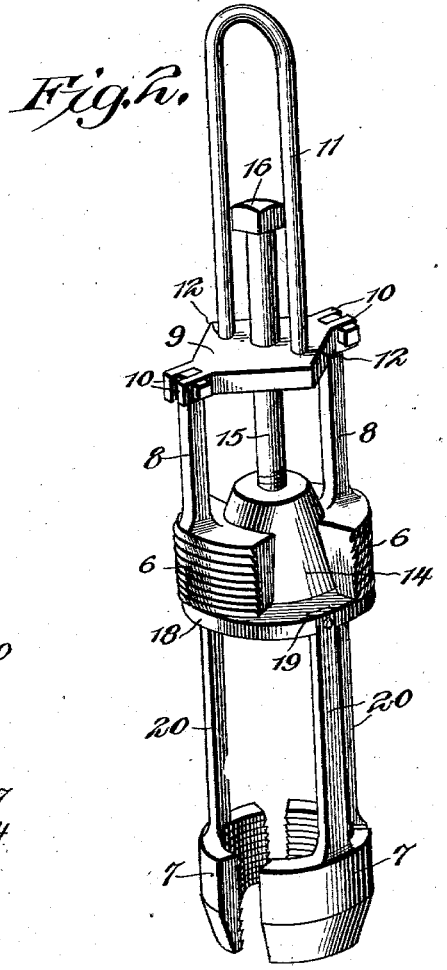

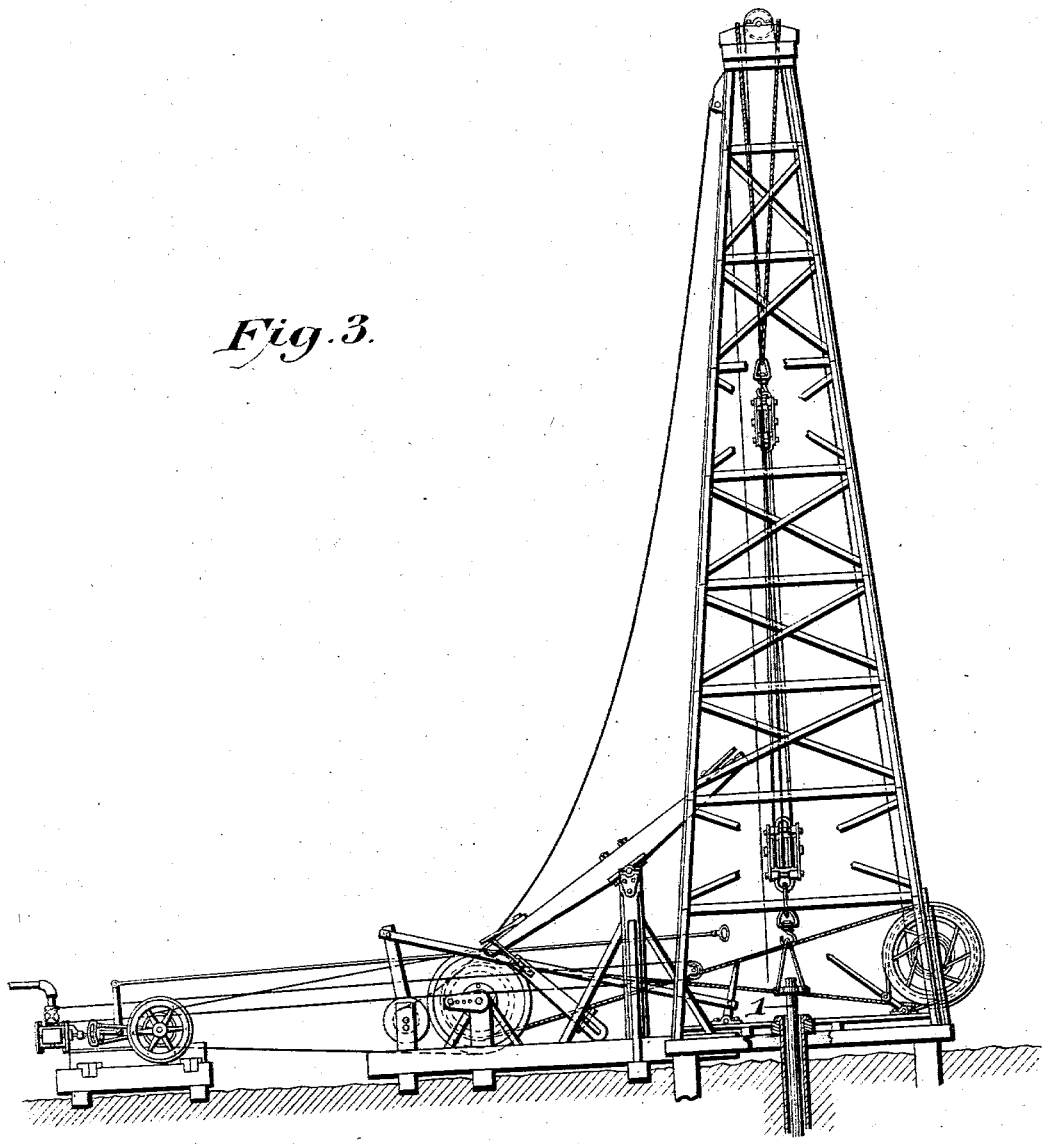

Patented June 9, 1903.

UNITED STATES PATENT OFFICE.

FREDERICK G. IRVINE AND JOHN B. BRADEN, OF SALEM, WEST VIRGINIA.

APPARATUS FOR REMOVING DRILL-TOOLS FROM WELLS.

SPECIFICATION forming part of Letters Patent No. 730,460, dated June 9, 1903.

Application filed July 29, 1901. Serial No. 70,127. (No model.)

*To all whom it may concern:*

Be it known that we, FREDERICK G. IRVINE and JOHN B. BRADEN, citizens of the United States, residing at Salem, in the county of Harrison and State of West Virginia, have invented a new and useful Apparatus for Removing Drilling-Tools from Wells, of which the following is a specification.

This invention relates to apparatus for removing drilling-tools from wells; and it has for its object in a thoroughly effective and reliable manner to recover drilling-tools from wells where they have become bound by the caving in of the walls of the well or from other causes.

A further object is to provide means coacting with the drilling-tool-engaging means by which to prevent the casing from dropping down over the tool should the casing pull apart under the stress of the mechanism employed for raising the casing and with it the tool.

A further object is to provide simple and positively-operated means for causing positive contact between the casing and the means engaging therewith for holding the casing raised.

A further object is to provide a device of the character specified which may, in addition to its function of sustaining the casing and of removing the jammed tool from the well, be employed to operate the tool whereby to dislodge any cavings—such as rock, sand, and the like—in the well.

With these and other objects in view, as will appear as the nature of the invention is better understood, the same consists in the novel construction and combination of parts of a device for removing drilling-tools from wells, as will be hereinafter fully described and claimed.

In the accompanying drawings, forming a part of this specification, and in which like numerals of reference indicate corresponding parts, we have illustrated a form of embodiment of our invention capable of carrying the same into effect, it being understood that the construction, arrangement, and manner of operation of the parts may be varied or changed without departing from the spirit of the invention.

In the drawings, Figure 1 is a view in sectional elevation exhibiting a section of the lower portion of a well, showing our improved apparatus in operative connection with the well-casing and with a tool therein. Fig. 2 is a detached detail view of the apparatus. Fig. 3 is a side elevation illustrating the construction for lifting the well-casing and the tool.

Referring to the drawings, 1 designates the well-casing; 2, a bowl carried by its lower portion and secured thereto, preferably by a threaded connection at 3. The bowl is reduced in interior diameter at its lower end to form a conical or wedge surface 4, the smaller diameter of the bowl being sufficient to allow it easily to slip over the largest diameter of the string of tools, and thereby permit the casing to be lowered over the tools without any binding action. The portion 5 of the string of tools herein shown is the rope-socket to which the cable or rope operating the tools is secured. The bowl 2, carried by the well-casing, may be of other construction than that shown, and as its precise construction forms no part of the present invention detailed illustration or description is deemed unnecessary.

The mechanism for removing a tool from the well and also for holding the casing from dropping down over the tool when the same is to be removed comprises two sets of toothed wedges 6 and 7, respectively, the wedges 6 being externally toothed to engage with the inner wall of the well-casing and the wedges 7 being internally toothed to engage with the shank of the tool to be removed, these wedges being preferably hardened steel, whereby to render the teeth effective for biting into the metal of the casing and of the tool, thus to render them effective for the purposes designed. The wedges 6, of which in this instance there are two in number, are each provided with a shank 8, the upper end of each of which is pivotally connected with a head 9, the head being provided on opposite sides with pairs of lugs or shoulders 10, between which the shanks 8 are pivoted, as clearly shown in Fig. 2. The head 9 is herein shown as a rectangular structure; but it is to be understood that it may be circular or of other shape, also that more than two of the wedges 6 may be employed, and still be within the scope of the invention. The head 9 has associated with it a yoke or bail 11, the manner of connecting the yoke with the head in this instance being by providing the head with two openings 12, through which the ends of the bail extend, and turning nuts 13 on the lower ends of the bail members, these nuts to bear against the under face of the head, as clearly shown in Fig. 1. The inner faces of the wedges 6 are smooth and diverge outward from the top to the bottom, and each constitute a segment of a circle, the smooth diverging faces of the wedges to engage with a cone 14, constituting an abutment carried by one end of a bolt 15, the bolt to pass through a central opening in the head 9 and to constitute a guide therefor, the bolt to be provided with a stop in the nature of a bolt-head 16, by which to limit the downward movement of the cone. As will be observed by reference to Fig. 1, when the wedges 6 are in engagement with the cone the head of the bolt 15 is some distance above the head 9, and the object of this arrangement is to permit the cone first to seat itself upon the tool, which will constitute a solid channel, after which the wedge 6 will be seated upon the cone, and by reason of the coaction between the converging sides of the cone and the wedges the latter will be forced outward against the inner walls of the well-casing, thereby causing the teeth of the wedges to bite into the said walls of the casing. The cone is provided on its under suring face with a chamber 17, (indicated by dotted lines in Fig. 1,) and in this chamber the head of the tool will rest when the cone is seated. While it is preferred generally to provide the cone with a seat, it is to be understood that it is not absolutely essential to the operation of the device that it should be employed, as in practice it may be omitted without interfering with the operation of the device. The lower portion of the cone is provided with a circumferential flange 18, provided with three equidistantly-spaced recesses 19, in which are bolted the shanks 20 of the wedges 7. As herein shown, there are but three of the wedges employed; but it is to be understood that the number may be increased and still be within the scope of our invention.

To the bail 11 there is connected a cable 21, which passes to the mouth of the well and is designed to be connected with suitable winding mechanism, (not shown,) whereby the grab device may be lowered into and raised out of the well independently of the casing 1.

In the operation of the device when a tool or string of tools has become jammed in the well and cannot be removed by the ordinary cable the casing 1 is sunk down as far as the head of the tool, after which the wedge-carrying portion of the apparatus is dropped into the well, and the wedges 7 by contact with the reduced diameter 4 of the bowl will be caused to bite into the shank of the tool. At the same time the cone 14 is seated on the top of the tool, and the wedges 6 then drop into engagement with the cone, and by reason of the coaction between the converging faces of the wedges and the cone, as before pointed out, the teeth of the wedges 6 will be caused to bite into the well-casing. Suitable hoisting mechanism is attached to the casing, and lifting movement is imparted thereto, the wedges 7 operating to lift the drill. Should the casing part or break from the strain applied thereto, the wedges 6 will prevent the same from dropping down over the tool. By reason of the coaction between the wedges 6 and the casing, together with the cone 14, the casing, with the tool, may be operated to cause the tool to loosen any caving that may have accumulated in the well, so that, in effect, the two sets of wedges constitute a double grip to permit the operator to work the tools up and down to dislodge any obstructive matter in the well.

It will be understood that in reciprocating the tool to loosen the same it is the casing 1 that is worked in an endwise direction to secure this reciprocation of the tool, and in elevating the tool power is applied to the casing only and not to the cable 21, which is connected to the grab device. When upward movement is applied to the casing, the internal beveled portion of the bowl 2 forces the wedges or jaws 7 into engagement with the tool, so as to interlock these parts for simultaneous vertical movement; but when downward movement is applied to the casing the beveled portion of the bowl moves away from the jaws and the interlocking connection between the tool and the casing is broken. In order that the tool may be forced downwardly and upwardly by corresponding movements of the casing, there has been provided means for interlocking the tool and the casing during the downward movement of the latter, said means being formed by the upper jaws or wedges 6, which are wedged between the conical portion 14 and the interior of the casing when the latter is dropped downwardly only. By this means there is an interlocked connection between the tool and the casing during the opposite movements of the latter, whereby these parts are always rigidly connected, for when one of the connections is loose the other is fast.

In Fig. 3 of the drawings is illustrated the mechanism for reciprocating the well-casing and the tool, and this mechanism consists of the standard oil-well rig, which is provided with the usual walking-beam; but as this mechanism does not constitute a portion of the present invention and is well understood in the art to which the present invention relates a detail description of the construction and operation of such oil-well rig is deemed unnecessary. The well-casing is connected with the cable of the rig and is operated in the ordinary manner.

From the foregoing description it will be seen that adequate provision is made not only for removing a tool from the well, but also that means are provided whereby in the case of damage to the well-casing, as from breaking or parting under the strain of the hoisting mechanism, the said casing will be prevented from dropping down over the tool, and, further, that by the provision of the double sets of toothed wedges and with the provision of the cone not only is the tool caused to be firmly engaged by its appropriate set of wedges, but also the casing to the cone is caused to be engaged by its appropriate set of wedges.

It is to be understood, as before pointed out, that the invention is not to be limited to the precise construction and arrangements of parts herein shown, as in the practical operation of the device various changes may suggest themselves to the operator which may be adopted without departing from the scope of the invention.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

What we claim is—

1. In an apparatus for removing drilling-tools from wells, the combination with a casing adapted for endwise-reciprocatory movement, of a grab to be lowered into the casing, and having means for interlocking the grab with the casing and also with a drill-tool to provide for simultaneously reciprocating the latter with the casing to loosen the tool and to draw it out of the well by manipulation of the casing.

2. In an apparatus of the character described, the combination with a well-casing which is adapted for endwise reciprocation, of tool-engaging means, and well-casing-engaging means, the two means being in such relation with the casing as to be alternately brought into operation by the reciprocatory movement of the casing.

3. In an apparatus of the character described, the combination with a well-casing which is adapted for endwise reciprocation, of an abutment to rest upon the top of the tool, casing-engaging means in coöperative relation with the abutment, and tool-gripping means carried by the abutment.

4. In an apparatus for removing drilling-tools from wells, the combination with a casing adapted for endwise-reciprocatory movement, of a grab to be lowered into the casing and having means for interlocking the grab with the interior of the casing, and also provided with means to be gripped between the casing and the tool for interlocking the same, whereby the tool may be reciprocated by a corresponding movement of the casing.

5. A device for removing drilling-tools from wells, comprising an abutment having a seat for the upper end of a drill-tool, casing-engaging clamping means in coöperative relation with the abutment to be gripped between the latter and the well-casing, and tool-gripping means carried by the abutment to engage the tool at an intermediate point of its length, whereby the tool is interlocked with the casing and may be reciprocated by a corresponding movement of the casing.

6. A device for removing drilling-tools from wells, comprising a grab to be lowered into a well-casing and having a double grip, one of which is constructed to engage the interior of a casing and interlock the grab therewith, and the other being constructed to engage the exterior of a drill-tool and interlock the same with the grab, whereby the tool may be reciprocated by a corresponding movement of the casing to loosen the tool and withdraw the same from the well.

7. A device for removing drilling-tools from wells, comprising a wedge-shaped abutment having a seat for engagement with the top of a drill-tool, a guide rising from the abutment, casing-engaging means slidably mounted upon the guide and in coöperative relation with the wedge-shaped abutment to force said means into engagement with the casing, lowering means connected to the casing-engaging means, and tool-engaging means carried by the abutment.

8. In an apparatus for removing drilling-tools from wells, a cone-shaped abutment having a seat for engagement with the top of a drill-tool, a guide rising from the abutment, a head swiveled upon and also slidably mounted upon the guide, a stop to limit the slidable movement of the head, a suspending-link rising from the head, and pendent externally-serrated casing-engaging jaws swung from the head and in coöperative relation with the cone-shaped abutment to force the jaws into engagement with the casing.

9. In an apparatus for removing drilling-tools from wells, the combination of an abutment having upwardly-converged sides and a chambered base to rest upon the top of the drill-tool, laterally-swinging and vertical reciprocatory casing-engaging wedges in coöperative relation with the inclined sides of the abutment, a guide connection with the upper end of the latter, and means for attaching a lowering device to the connection between the wedges and the abutment.

10. In an apparatus of the character specified, a cone-abutment provided with a guide having a stop, a head working on the guide, externally-serrated well-casing-engaging wedges having shanks pivotally connected with the head and coacting with the abutment, and internally-serrated tool-engaging wedges having shanks secured to the abutment.

11. In an apparatus of the character specified, a cone-abutment provided on its upper side with a guide and in its under surface with a recess, a head working on the guide and carrying well-casing-engaging means to coact with the abutment and tool-engaging means carried by the abutment.

12. In an apparatus of the character specified, the combination with a well-casing having its lower extremity provided with a bowl having its lower portion constricted, of a cone-abutment movable in the casing and carrying at its upper portion a headed guide, and at its lower portion internally-serrated tool-engaging wedges to be projected inward by contact with the constricted portion of the bowl, a head working on the said guide, externally-serrated well-casing-engaging wedges carried by the head and coacting with the abutment, and a bail carried by the head.

13. In an apparatus of the character described, the combination with an endwise-reciprocatory casing, of a tool-grab located within the casing and having an intermediate support to rest upon the top of a tool, lower tool-engaging means, and upper casing-engaging means, the former means being active during a downward movement only of the casing and the other means being active during an upward movement only of the casing.

14. In an apparatus for removing drilling-tools from wells, the combination with an endwise-reciprocatory casing, of a tool-grab located within the casing and having a support to rest upon the top of a tool, tool-gripping means depending from the support, and casing-gripping means located above the tool-engaging means, whereby the grab is capable of interlocking a tool with the casing for simultaneous movement therewith.

15. A device for removing drilling-tools from wells, comprising a cone-abutment having a recess in the bottom thereof to receive the upper end of a tool, shanks pendent from the abutment, internally-serrated and externally-beveled tool-gripping jaws carried by the lower ends of the shanks, a cylindrical stem rising from the abutment and having a head upon its upper end, a swiveled head slidably mounted upon the stem and limited in its outward movement by the fixed head of the stem, pendent laterally-swinging shanks pivoted to opposite sides of the swiveled head, externally-serrated and internally smooth and beveled casing-engaging jaws in operative relation with the beveled sides of the cone-abutment, and a link connected to the slidable head.

16. In an apparatus of the class described, the combination with the movable casing, of a grab having means for engaging the upper portion of the drill-tool to hold it from longitudinal movement, means for gripping the interior of the casing to lock the same from independent movement, and means for gripping the side of the drill-tool at a point below its upper end and near the lower end of the casing, whereby the drill-tool and casing may be locked together and reciprocated simultaneously.

17. An apparatus for removing drill-tools from wells, comprising an abutment to rest upon the top of a drill-tool, means carried by and constructed to interlock the abutment with a well-casing to prevent the abutment from being forced upwardly by the tool during a downward movement of the casing, and means carried by the abutment for gripping the drilling-tool to interlock the same during an upward movement of the casing.

18. An apparatus for removing drill-tools from wells, comprising an abutment to rest upon the top of a drill-tool, vertically-movable casing-gripping means carried by the abutment and coöperating therewith to connect the same with a well-casing when the abutment rests upon the top of the drill-tool, a suspending device connected to the casing-engaging means to hold the same out of engagement with the casing when the apparatus is being lowered, and means carried by the abutment for gripping a drill-tool, whereby the apparatus is adapted to interlock a drill-tool and well-casing for simultaneous endwise movements.

19. In an apparatus for removing drill-tools from wells, the combination with a well-casing which is adapted for reciprocation, of a grab to be lowered into the casing, and embodying an abutment to rest upon the top of a drill-tool and having upwardly-converged sides, vertically-movable casing-gripping means carried by the abutment in coöperative relation with the inclined sides to prevent upward movement of the abutment during a downward movement of the casing, a suspending device connected to the casing-engaging means for lowering the grab and to hold said casing-engaging means out of engagement with the abutment and the casing when the grab is being lowered, and tool-gripping means hung from the abutment and constructed to be wedged between the sides of the tool and the sides of the casing when the latter is moved upwardly to connect the drill-tool to the casing.

In testimony that we claim the foregoing as our own we have hereto affixed our signatures in the presence of two witnesses.

FRED. G. IRVINE.
JOHN B. BRADEN.

Witnesses:
E. K. SCOTT, Jr.,
LLOYD STUCK.